(12) United States Patent
Chikami et al.

(10) Patent No.: US 10,921,023 B2
(45) Date of Patent: Feb. 16, 2021

(54) SYSTEM FOR AIR-CONDITIONING AND HOT-WATER SUPPLY

(71) Applicants: DAIKIN INDUSTRIES, LTD., Osaka (JP); DAIKIN EUROPE N.V., Ostend (BE)

(72) Inventors: Hideo Chikami, Ostend (BE); Tim Coessens, Ostend (BE)

(73) Assignees: DAIKIN INDUSTRIES, LTD., Osaka (JP); DAIKIN EUROPE N.V., Ostend (BE)

( * ) Notice: Subject to any disclaimer, the term of this patent is extended or adjusted under 35 U.S.C. 154(b) by 47 days.

(21) Appl. No.: 16/335,958

(22) PCT Filed: Sep. 14, 2017

(86) PCT No.: PCT/JP2017/033328
§ 371 (c)(1),
(2) Date: Mar. 22, 2019

(87) PCT Pub. No.: WO2018/056177
PCT Pub. Date: Mar. 29, 2018

(65) Prior Publication Data
US 2019/0309989 A1    Oct. 10, 2019

(30) Foreign Application Priority Data
Sep. 23, 2016    (EP) .................................... 16190505

(51) Int. Cl.
*F24H 4/02*    (2006.01)
*F25B 13/00*    (2006.01)
(Continued)

(52) U.S. Cl.
CPC ............. *F24H 4/02* (2013.01); *F24F 1/0003* (2013.01); *F24F 5/0096* (2013.01); *F24F 11/30* (2018.01);
(Continued)

(58) Field of Classification Search
CPC .. F24F 11/77; F24F 11/83; F24F 11/30; F24F 1/0003; F24F 5/0096; F24F 2110/10;
(Continued)

(56) References Cited

U.S. PATENT DOCUMENTS

2011/0302949 A1*  12/2011  Honda ...................... F24D 3/18
                                                                        62/324.6
2013/0051787 A1    2/2013  Tochio
(Continued)

FOREIGN PATENT DOCUMENTS

EP    2538146 A2    12/2012
EP    2597381 A2    5/2013
(Continued)

OTHER PUBLICATIONS

International Search Report for PCT/JP2017/033328 (PCT/ISA/210) dated Nov. 23, 2017.
(Continued)

*Primary Examiner* — Joseph F Trpisovsky
(74) *Attorney, Agent, or Firm* — Birch, Stewart, Kolasch & Birch, LLP.

(57) ABSTRACT

Provided is a system for air-conditioning and hot-water supply configured to selectively perform cooling and heating operations, comprising: an outdoor unit having a compressor and an outdoor heat exchanger; at least one or more indoor units each of which is connected to the outdoor unit and includes an indoor heat exchanger; a hot-water supply unit connected to the outdoor unit so as to be arranged in parallel to the indoor unit and including a refrigerant-water heat exchanger; a controller configured to monitor for a request for hot-water supply from the hot-water supply unit while a cooling operation is being performed in at least one of the indoor units, and then to start the heating operation in accordance with the request; wherein the controller trans- (Continued)

mits to all of the indoor units, which are turned on for said cooling operation, a fan-stop command to stop a fan arranged at each indoor unit.

6 Claims, 11 Drawing Sheets

(51) Int. Cl.
    *F24F 5/00*     (2006.01)
    *F24F 1/0003*     (2019.01)
    *F24F 11/83*     (2018.01)
    *F24F 11/77*     (2018.01)
    *F24F 11/30*     (2018.01)
    *F25B 49/02*     (2006.01)
    *F24F 110/10*     (2018.01)

(52) U.S. Cl.
    CPC .............. *F24F 11/77* (2018.01); *F24F 11/83* (2018.01); *F25B 13/00* (2013.01); *F25B 49/02* (2013.01); *F24F 2110/10* (2018.01); *F24F 2221/183* (2013.01); *F24F 2221/54* (2013.01); *F25B 2313/003* (2013.01); *F25B 2313/006* (2013.01); *F25B 2313/0233* (2013.01); *F25B 2313/0293* (2013.01); *F25B 2313/02334* (2013.01); *F25B 2313/02741* (2013.01); *F25B 2500/27* (2013.01); *F25B 2600/0251* (2013.01); *F25B 2600/2513* (2013.01); *F25B 2700/2104* (2013.01); *F25B 2700/2106* (2013.01)

(58) Field of Classification Search
    CPC . F24F 2221/183; F24F 2221/54; F25B 13/00; F25B 49/02; F25B 2313/003; F25B 2313/006; F25B 2313/0233; F25B 2313/02334; F25B 2313/02741; F25B 2313/0293; F25B 2500/27; F25B 2600/0251; F25B 2600/2513; F25B 2700/2104; F25B 2700/2106; F24H 4/02; F24D 3/18

See application file for complete search history.

(56) References Cited

U.S. PATENT DOCUMENTS

| 2013/0180274 A1 | 7/2013 | Tamaki et al. | |
| 2013/0213072 A1* | 8/2013 | Kawagoe | F25B 30/02 |
| | | | 62/238.6 |
| 2015/0219351 A1* | 8/2015 | Yamashita | F24F 3/06 |
| | | | 165/218 |
| 2018/0252434 A1* | 9/2018 | Hawkins | F24D 15/04 |

FOREIGN PATENT DOCUMENTS

| EP | 2 653 805 A | 10/2013 |
| JP | 2012-007779 A | 1/2012 |
| JP | 2012-13357 A | 1/2012 |
| JP | 2012-97910 A | 5/2012 |
| JP | 2013-046269 A | 3/2013 |

OTHER PUBLICATIONS

Search Report for European Patent Application No. 16190505.4, completed on Mar. 9, 2017.

* cited by examiner

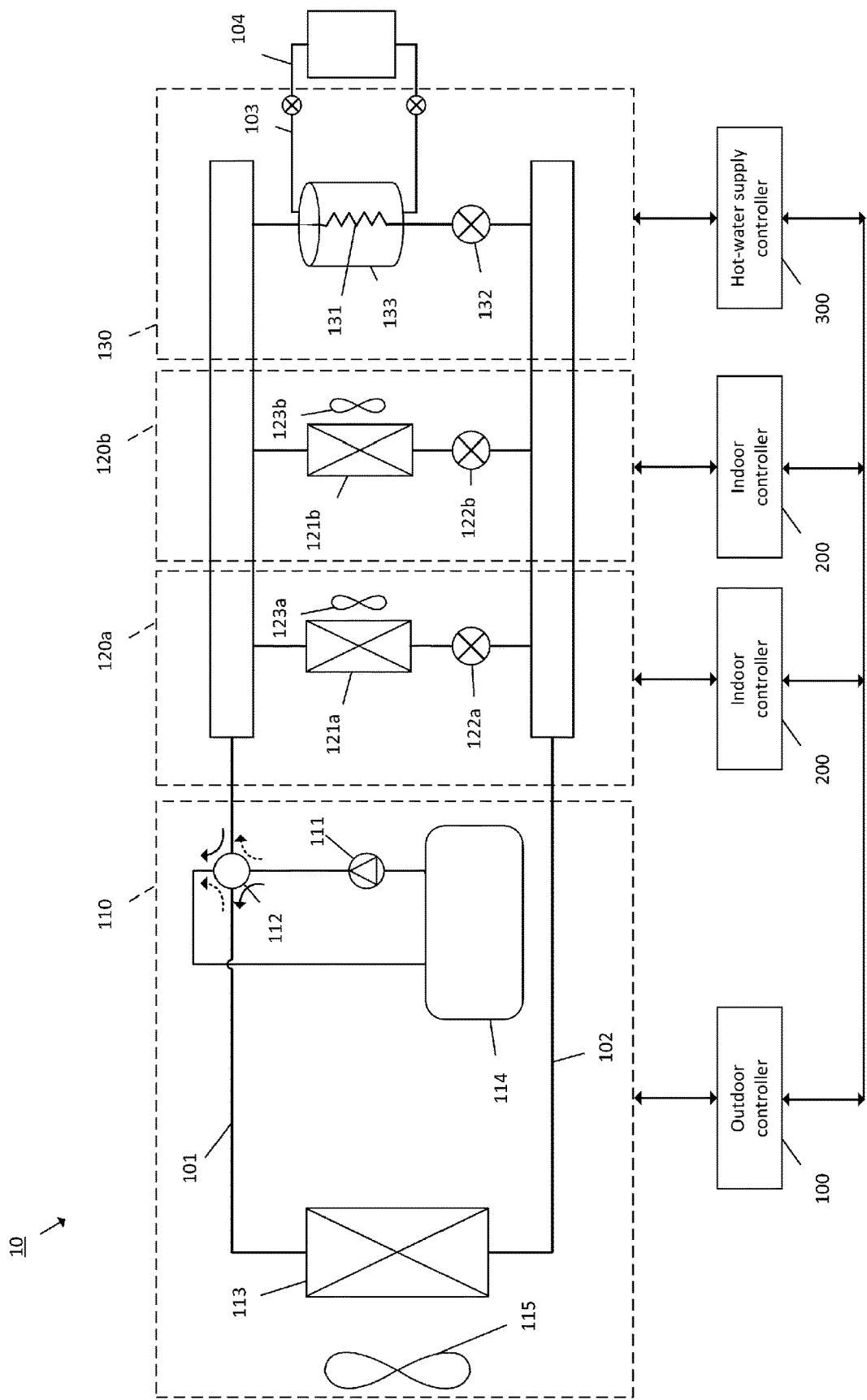
[Fig. 1]

[Fig. 2]
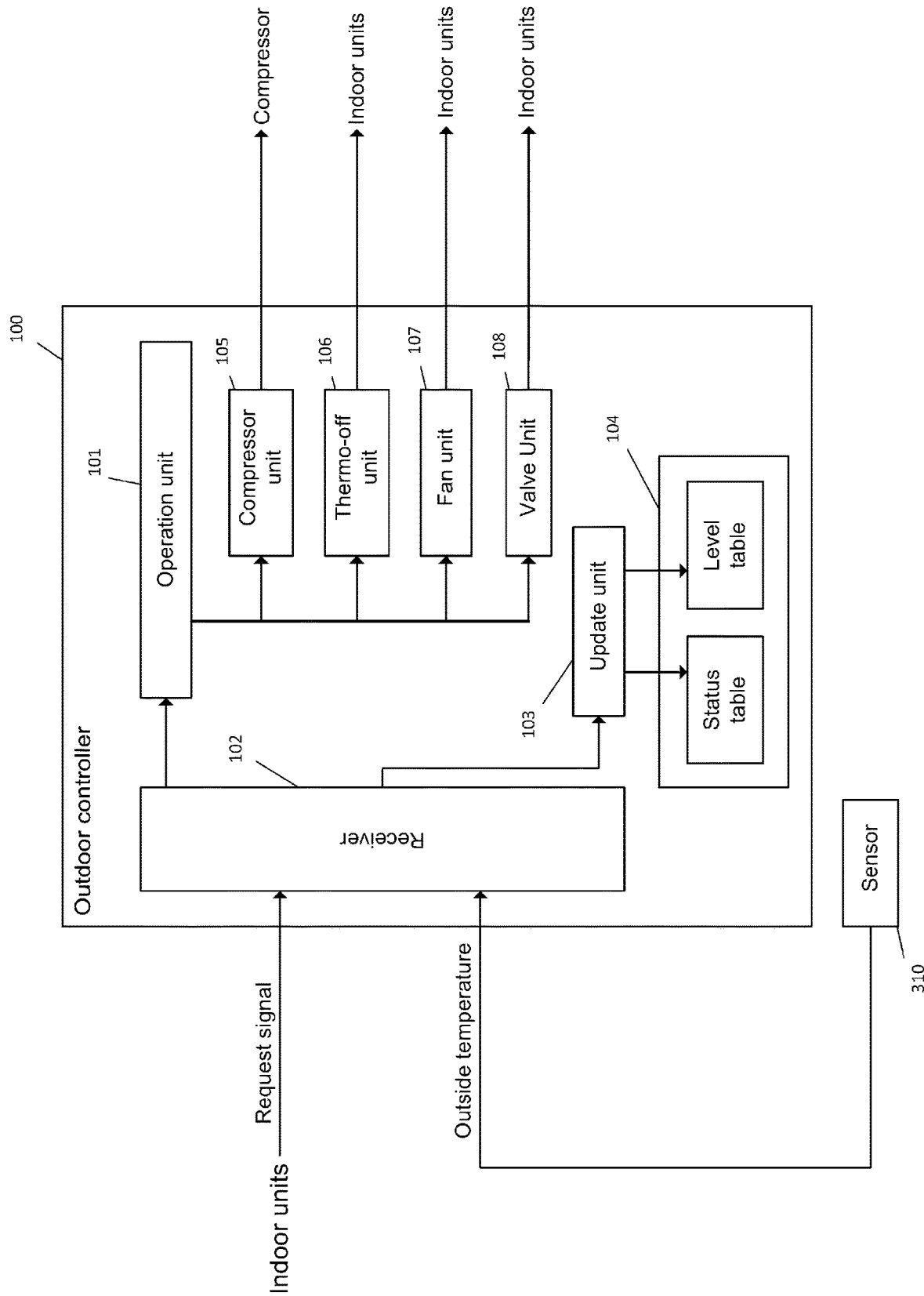

[Fig. 3]

Level table

| Request level | Step width to change frequency |
|---|---|
| 0 | 0 |
| 1 | -3 |
| 2 | -2 |
| 3 | -1 |
| 4 | +1 |
| 5 | +2 |
| 6 | +3 |

[Fig. 4A]

Status table (outdoor unit)

| Area | Request level | Operation status | Target temperature | Wind | Current temperature |
|---|---|---|---|---|---|
| 1 | 0 | ON: Cooling | Ttg1 | High | Tc1 |
| 2 | 1 | ON: Cooling | Ttg2 | Middle | Tc2 |
| 3 | 2 | ON: Cooling | Ttg3 | Low | Tc3 |
| 4 | | OFF | | | |
| 5 | | OFF | | | |

[Fig. 4B]

Status table (indoor unit)

| Area | Request level | Operation status | Target temperature | Wind | Current temperature | Thermo-off temperature |
|---|---|---|---|---|---|---|
| 1 | 0 | ON: Cooling | Tt1 | High | Tc1 | Toff1 |

[Fig. 5]
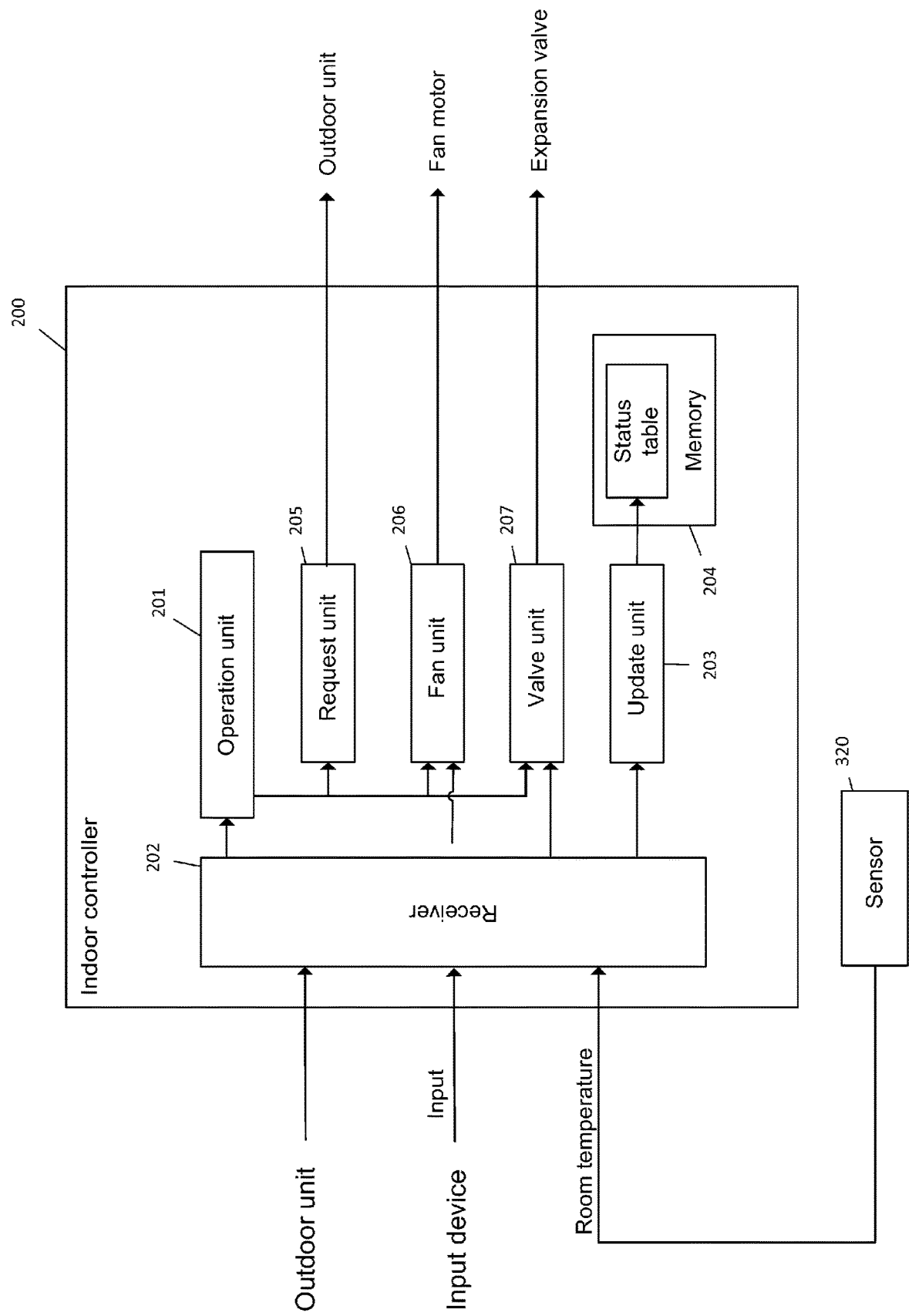

[Fig. 6]
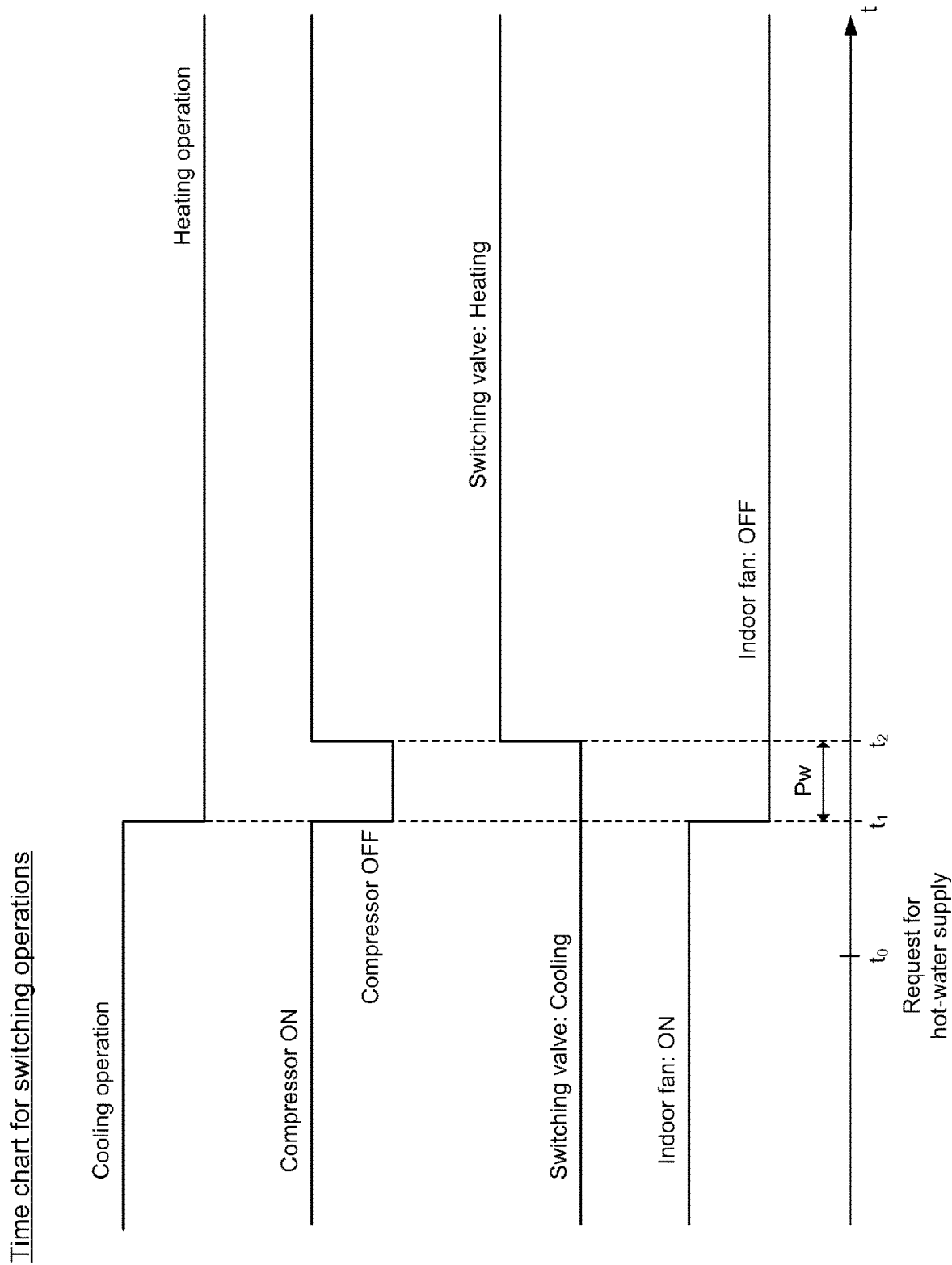

[Fig. 7A]
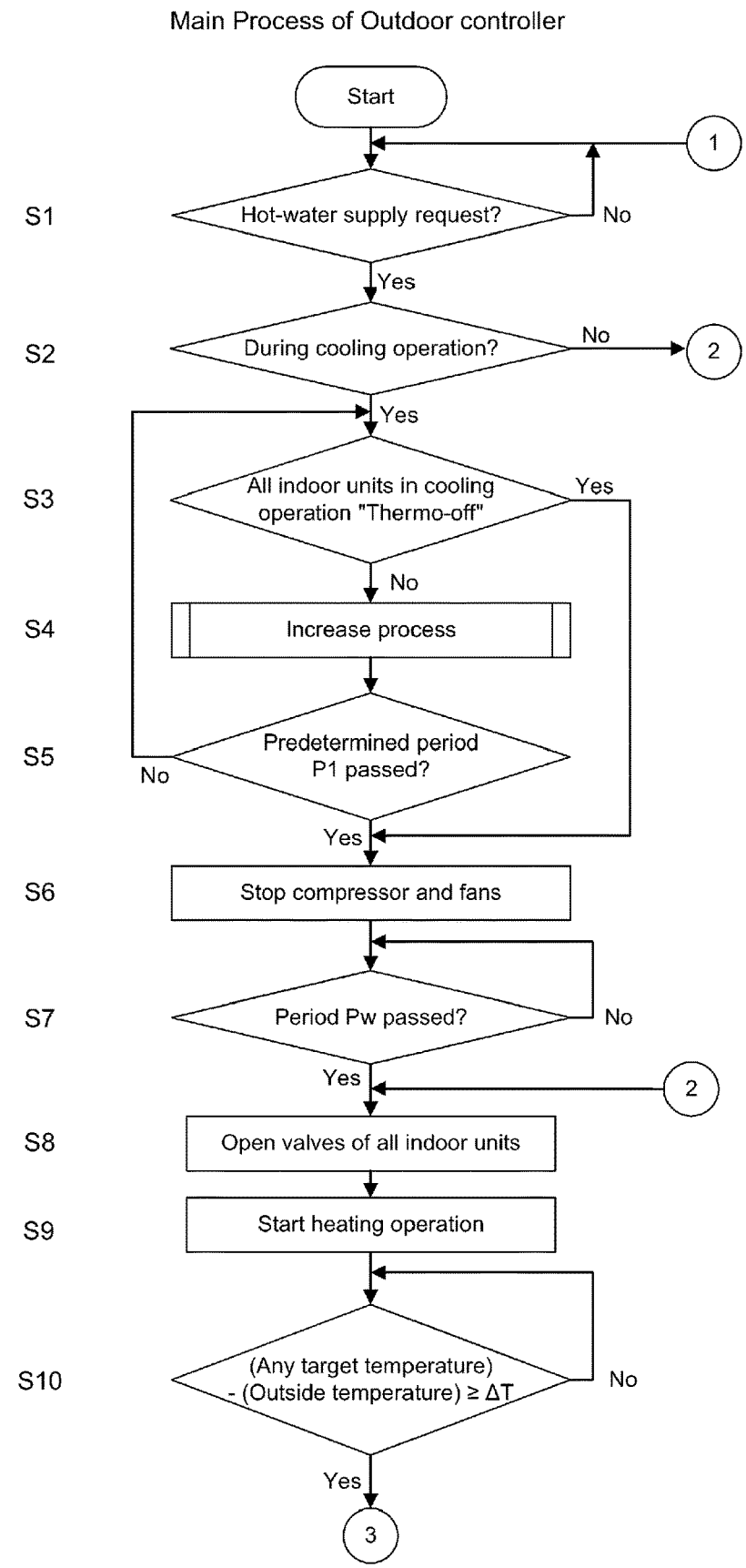

[Fig. 7B]
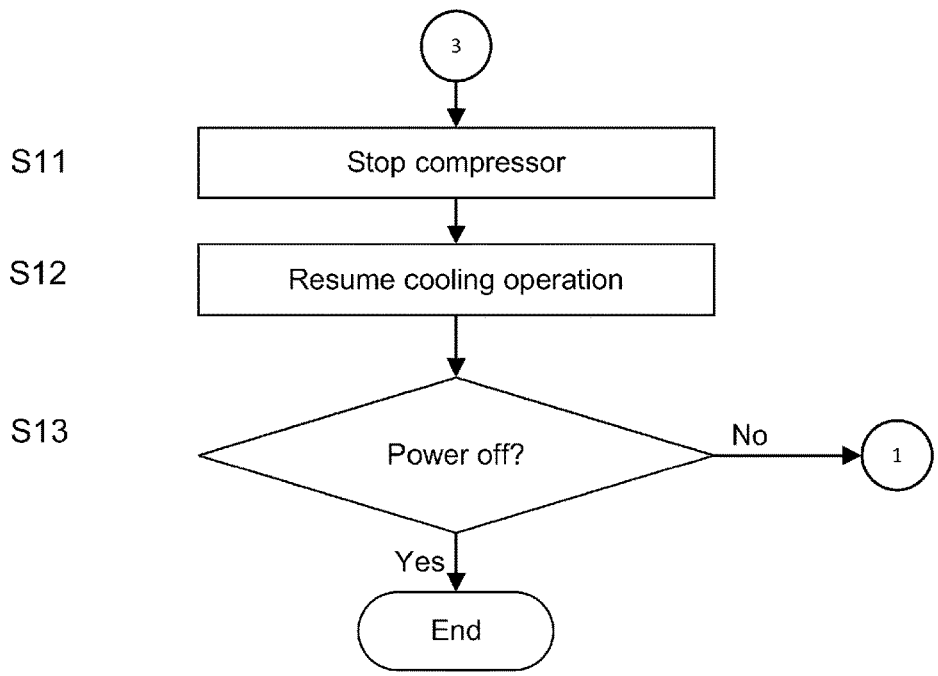
[Fig. 8]
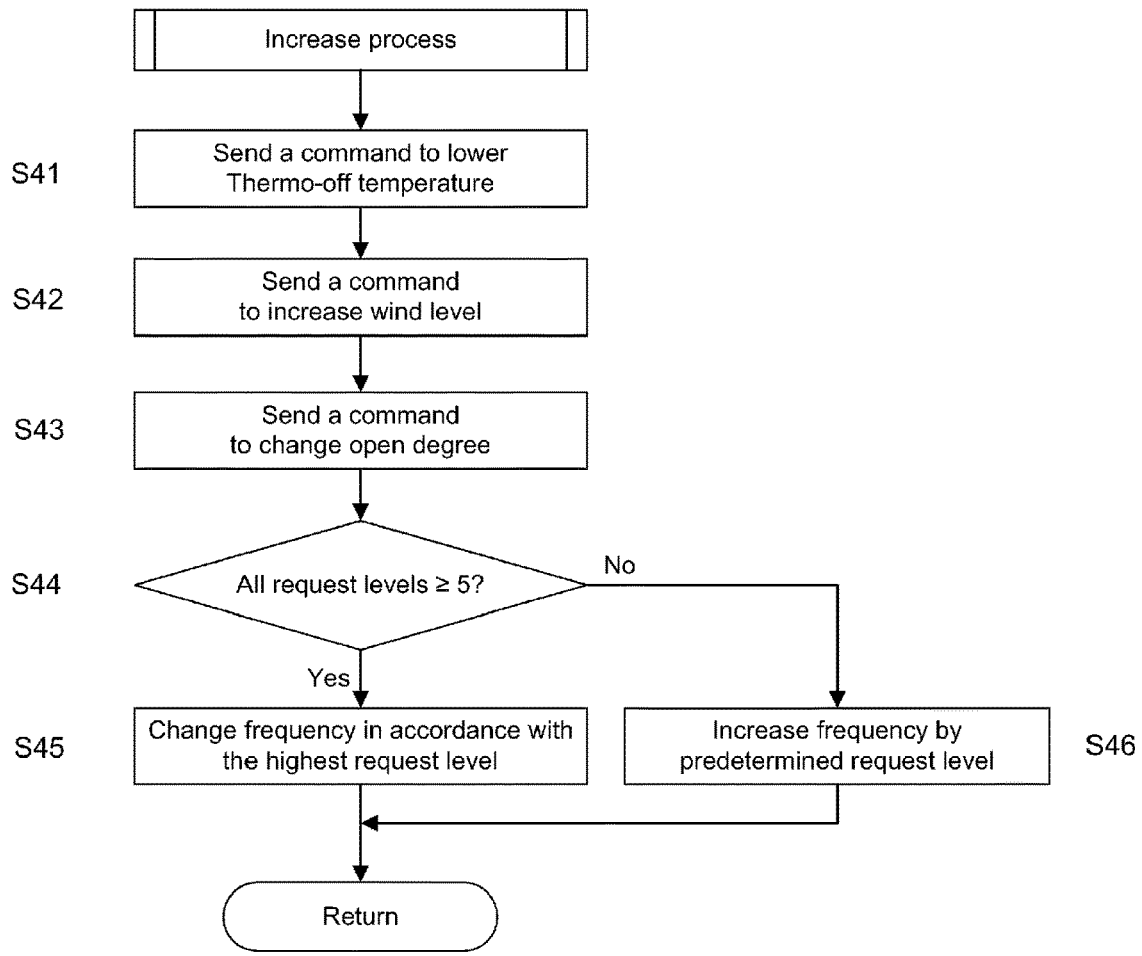

[Fig. 9]
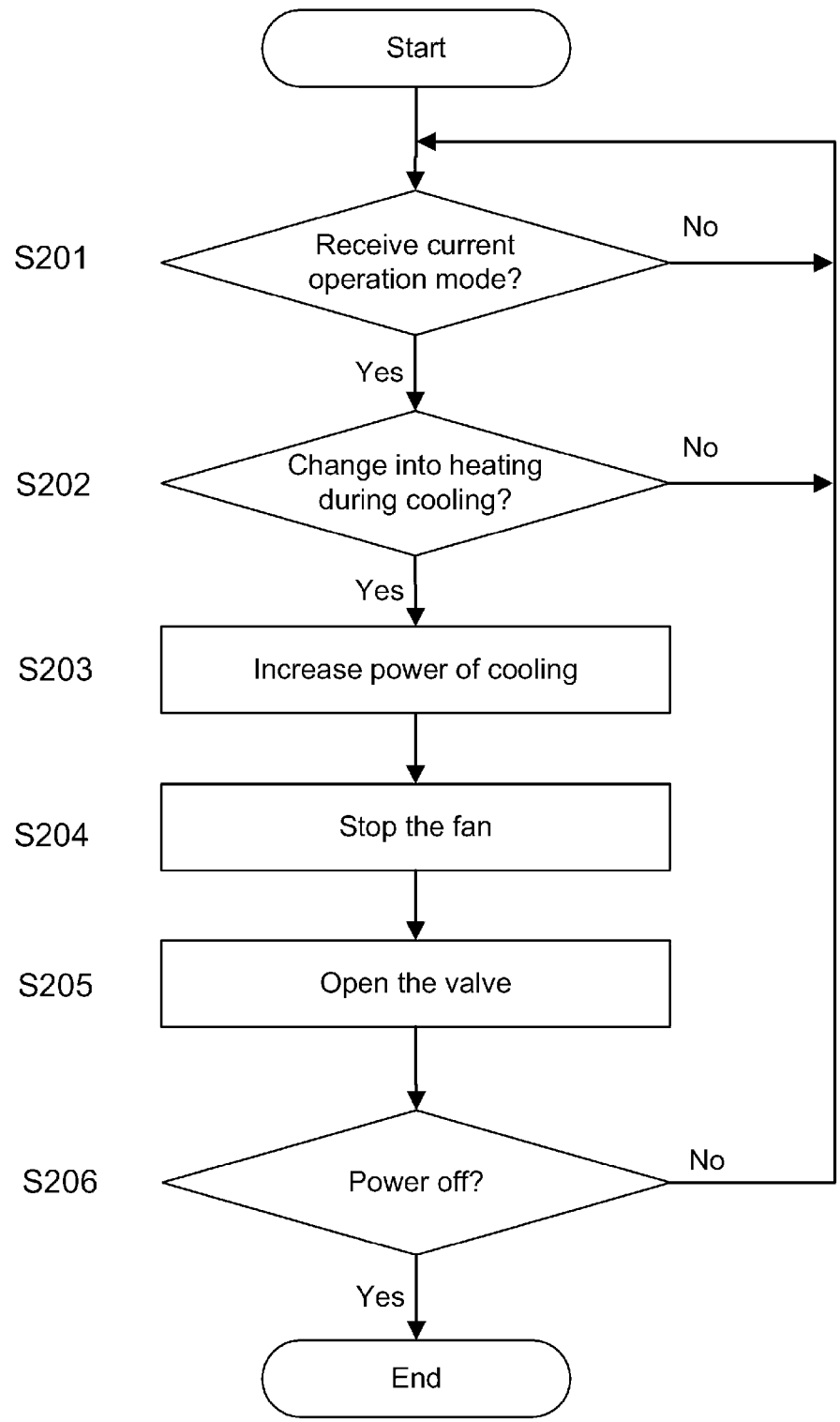

[Fig. 10]
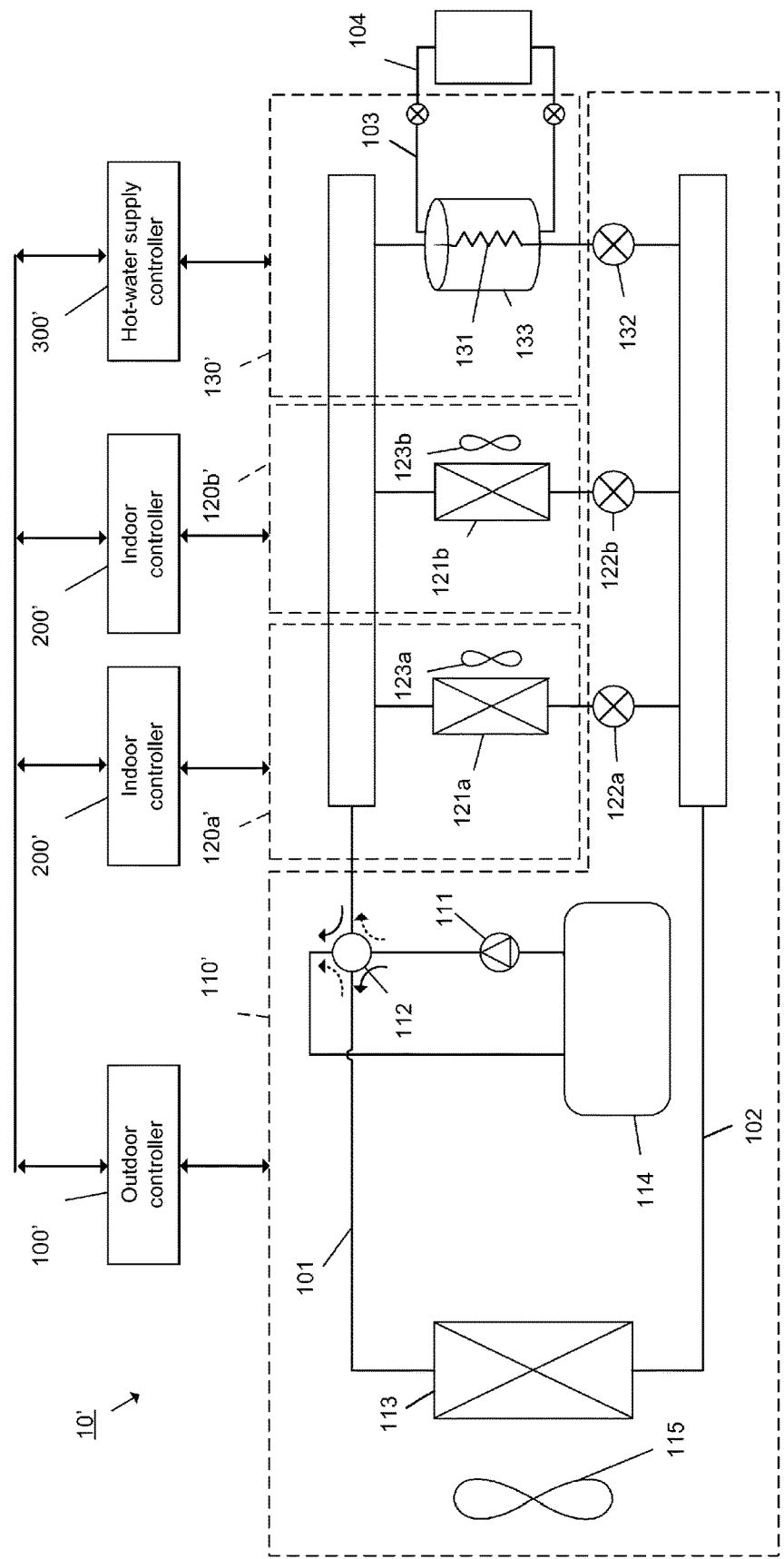

SYSTEM FOR AIR-CONDITIONING AND HOT-WATER SUPPLY

TECHNICAL FIELD

The present invention relates to a system for air-conditioning and hot-water supply that is equipped with a heat pump.

BACKGROUND ART

EP 2 653 805 A1 proposes a system for air-conditioning and hot-water supply which is equipped with a heat pump and is capable of simultaneously performing air conditioning operation and hot-water supply operation. The system includes an outdoor unit having a compressor and an outdoor heat exchanger, at least one indoor unit connected to the outdoor unit and including an indoor heat exchanger, at least one hot-water supply unit connected to the outdoor unit so as to be arranged in parallel to the indoor unit. The hot-water supply unit includes a refrigerant-water heat exchanger.

The above system disclosed in EP 2 653 805 A1 performs a cooling operation and a heating operation. During the cooling operation, the hot-water supply unit cools down water. During the heating operation, the hot-water supply unit heats up water. Accordingly, no new hot-water is supplied during the cooling operation.

On the other hand, it is necessary to store enough amount of hot water at a target temperature in a water tank so as to meet demands for domestic use of hot water in a kitchen, bath room and the like. New hot-water can be supplied, for example, during night time in that demand for a cooling operation is in general less often than day time. The hot-water supply unit can be configured to output a request for hot-water supply based on time and temperature of hot water stored in a water tank connected to the hot-water supply unit.

However, a request for hot-water supply can occur during a cooling operation performed at at least one indoor unit. Then the cooling operation will be immediately turned off such that a heating operation can start upon the request for hot-water supply. This means that the indoor unit in the cooling operation changes its operation into the heating operation against the cooling operation set by a user.

CITATION LIST

Patent Literature

PTL 1: EP 2 653 805 A1

SUMMARY OF INVENTION

Technical Problem

The object of the present invention is to solve the problem above, and is to provide a system for air-conditioning and hot-water supply which maintain users' comfort even when a hot-water supply operation is necessary.

Solution to Problem

A first aspect of the present invention provides a system for air-conditioning and hot-water supply and configured to selectively perform a cooling operation and heating operation described herein. Advantageous effects can be achieved as described below.

The system for air-conditioning and hot-water supply and configured to selectively perform a cooling operation and a heating operation according to the first aspect comprising: an outdoor unit having a compressor and an outdoor heat exchanger; at least one or more indoor units each of which is connected to the outdoor unit and includes an indoor heat exchanger; a hot-water supply unit connected to the outdoor unit so as to be arranged in parallel to the at least one or more indoor units and including a refrigerant-water heat exchanger; a controller configured to monitor an occurrence of a request for hot-water supply from the hot-water supply unit during the cooling operation being performed at at least one indoor unit among the at least one or more indoor units, and then to start the heating operation in accordance with the request; wherein the controller is further configured to transmit each of the at least one or more indoor unit units, which is turned on for said cooling operation, a fan-stop command to stop a fan arranged at each indoor unit.

The operation mode of the system is switched from said cooling operation to the heating operation after receipt of said request for hot-water supply (hereinafter "hot-water request") during said cooling operation. The heating operation is an operation for heating space and hot-water supply. Each indoor unit has an indoor fan to generate wind and a fan motor to drive the indoor fan. The fan motor stops driving the indoor fan in accordance with the fan-stop command. Accordingly, no warm wind blows from the indoor unit which is supposed to be in said cooling operation. Thereby, the user comfort can be maintained.

According to a preferred embodiment of the system mentioned above, the controller is further configured to transmit to the compressor a compressor-stop command to stop the compressor; and the controller is further configured to transmit the compressor-stop command and the fan-stop command substantially at the same time.

With the configuration above, the indoor fan of each indoor unit in said cooling operation stops working substantially simultaneously when said cooling operation stops. In other words, the indoor fan of each indoor unit in said cooling operation can work until the end of said cooling operation. When the indoor fan of each indoor unit in said cooling operation stops working during said cooling operation, the efficiency of said cooling operation drops down. Accordingly, the configuration above enables to maintain the efficiency of said cooling operation.

According to another preferred embodiment of any one of the systems mentioned above, the controller is further configured to transmit said fan-stop command before starting the heating operation.

With the configuration above, each fan motor stops driving the corresponding indoor fan prior to the start of the heating operation. Otherwise, warm wind comes out from each indoor unit which is supposed to be in said cooling operation but is brought into the heating operation. Thereby, the user's comfort can be ensured.

According to another preferred embodiment of any one of the systems mentioned above, the system further comprises a plurality of valves each of which is arranged for the hot-water supply unit and each of the at least one or more indoor units, and which is configured to control amount of refrigerant supplied to the corresponding unit.

The configuration above enables to individually control the amount of the refrigerant supplied to the hot-water supply unit and each of the indoor units.

According to another preferred embodiment of the system with the plurality of valves, the controller is configured to maintain each valve corresponding to each of all indoor units in a predetermined open degree during the heating operation.

The controller keeps the valves corresponding to all indoor units slightly open. In this situation, some indoor units are supposed to be in said cooling operation but are brought into the heating operation. Some indoor units are turned off. Irrespective of the operation status of the indoor units, the controller controls such that all valves corresponding to all indoor units are slightly open. Thereby, it is less likely that the refrigerant stagnates in the refrigerant circuit and an insufficient amount of the refrigerant flows into the hot-water supply unit.

BRIEF DESCRIPTION OF DRAWINGS

FIG. 1 shows an example of a refrigerant circuit formed by a system for air conditioning and hot-water supply according to an embodiment of the present invention.

FIG. 2 shows a block diagram showing functions of an outdoor controller in FIG. 1.

FIG. 3 shows a level table stored in the outdoor controller in FIG. 1.

FIG. 4A shows an example of a status table stored in the outdoor controller in FIG. 1.

FIG. 4B shows an example of a status table stored in the indoor controller in FIG. 1.

FIG. 5 is a block diagram showing functions of an indoor controller of the indoor unit in FIG. 1.

FIG. 6 shows an example of a time chart for switching from a cooling operation to a heating operation triggered by a hot-water request.

FIG. 7A shows an example of the main process performed by the outdoor controller in FIG. 1.

FIG. 7B shows an example of the main process performed by the outdoor controller in FIG. 1.

FIG. 8 shows an example of the flow of increase process during the main process in FIGS. 7A, 7B.

FIG. 9 shows an example of the main process performed by the indoor controller in FIG. 1.

FIG. 10 shows another example of a refrigerant circuit formed by a system for air conditioning and hot-water supply according to another embodiment of the present invention.

DESCRIPTION OF EMBODIMENTS

A preferred embodiment of the present invention will be described with reference to the drawings.

FIG. 1 shows an example of a refrigerant circuit formed by a system 10 for air conditioning and hot-water supply according to an embodiment of the present invention. It should be noted that the relationship between the sizes of components shown in the appended drawings may differ from the relationship between actual sizes of the components.

<Configuration of the System 10>

The system 10 is installed in a building such as an apartment, a hotel, an office building as well as a house for individuals. The system 10 is configured to selectively perform a heating operation accompanied by hot-water supply and a cooling operation. The system 10 performs the heating and cooling operations by using heat pump mechanism which circulates a refrigerant in the refrigerant circuit.

The system 10 includes an outdoor unit 110, at least one or more indoor units 120a, 120b, and a hot-water supply unit 130, which are connected to each other. Each of the indoor units 120a, 120b and the hot-water supply unit 130 are connected in parallel to the outdoor unit 110 which serves as a heat source unit. Although two indoor units 120 a, 120b are shown in FIG. 1, the number of indoor units is not particularly limited. Only one indoor unit 120 or a plurality of indoor units 120a, 120b, . . . may be arranged in the system 10 according to the same manner as the indoor unit 120 a, 120b.

The outdoor unit 110, the indoor units 120a, 120b, and the hot-water supply unit 130 are connected by a gas main pipe 101 and a liquid main pipe 102. The gas main pipe 101 and the liquid main pipe 102 serve as a refrigerant pipe through which the refrigerant flows so as to circulate in the refrigerant circuit.

Further, a water pipe 103 is connected to the hot-water supply unit 130 so as to receive fresh water from and supply warm/cold water to a water circuit 104. The water circuit 104 is outside of the system 10. The water circuit 104 supplies fresh water to the hot-water supply unit 130, and guides the warm/cold water from the hot-water supply unit 130 to areas where the water is used. The hot-water supply unit 130 is configured to heat or cool the supplied water, and store the heated or cooled water in a water tank 133.

<Outdoor Unit 110>

The outdoor unit 110 performs the heating operation or the cooling operation on the outdoor unit side to supply heating energy or cooling energy to the indoor units 120a, 120b and the hot-water supply unit 130. The outdoor unit 110 includes a compressor 111, a switching valve 112, an outdoor heating exchanger 113, an accumulator 114, and an outdoor fan 115.

During the heating operation, the outdoor unit 110 forms a refrigerant circuit for heating (hereinafter the heating circuit) in which the outdoor heating exchanger 113, the switching valve 112, the accumulator 114, the compressor 111, and the switching valve 112 are sequentially connected in this order from the liquid main pipe 102 side toward the gas main pipe 101.

During the cooling operation, the outdoor unit 110 forms a refrigerant circuit for cooling (hereinafter the cooling circuit) in which the switching valve 112, the accumulator 114, the compressor 111, the switching valve 112, and the outdoor heating exchanger 113 are sequentially connected in this order from the gas main pipe 101 side toward the liquid main pipe 102.

The compressor 111 is configured to suck and compress the refrigerant to a high-temperature and high-pressure state. The compressor 111 is not limited to a particular type of compressor. For example, the compressor 111 may be a reciprocating compressor, a rotary compressor, a scroll compressor, and a screw compressor. The compressor 111 is preferably of a type whose rotation speed can be variably controlled by, for example, an inverter.

The switching valve 112 is configured to switch the flow of refrigerant in accordance with a requested operation, i.e. heating or cooling operation. The switching valve 112 is configured to switch the refrigerant circuit between the heating circuit and the cooling circuit.

The outdoor heat exchanger 113 is configured to function as a condenser during the cooling operation, and function as an evaporator during the heating operation. The outdoor heat exchanger 113 exchanges heat with the air sent from the outdoor fan 115 so as to condense or evaporate the refrigerant flowing therein. The heat exchange amount of the outdoor heat exchanger 113 can be controlled by, for example, varying the rotation speed of the outdoor fan 115.

The accumulator 114 is disposed on the suction side of the compressor 111, and is configured to store excessive refrigerant. The accumulator 114 may be any container for storing excessive refrigerant.

The outdoor fan 115 is disposed near the outdoor heat exchanger 113 so as to send wind toward the outdoor heat exchanger 113. Preferably, the wind level of the outdoor fan 115 is variable by, for example, changing the rotation speed of the corresponding motor.

<Indoor Unit 120a, 120b>

Hereinafter, the common configuration and function among the indoor units 120a, 120b are explained. Therefore, the explanation about one indoor unit is applicable to another indoor unit, and vice versa.

The indoor unit 120a has a function of receiving heating energy or cooling energy from the outdoor unit 110 so as to perform the heating operation or the cooling operation on each indoor unit side. The indoor unit 120a includes an indoor heat exchanger 121a and an expansion valve 122a, which are connected in series to each other. Further, an indoor fan 123a is disposed near the indoor heat exchanger 121 so as to send out warm or cool air from the indoor unit 120a.

The indoor heat exchanger 121 is configured to function as a condenser during the heating operation, and to function as an evaporator during the cooling operation. The indoor heat exchanger 121 transfers heat from the refrigerant flowing therein to the air supplied by the indoor fan 123a so as to condense or evaporate the refrigerant.

The expansion valve 122 is configured to reduce the pressure of the refrigerant and to expand the refrigerant. It is preferable that the opening degree of the expansion valve 122 is variably controllable. Examples of such valves include precise flow control means such as an electronic expansion valve, and inexpensive refrigerant flow control means such as a capillary tube.

The indoor fan 123a is disposed near the indoor heat exchanger 121 so as to send out warm or cool wind from the indoor unit 120a and introduce air from outside into inside of a housing (not shown) of the indoor unit 120a. Preferably, the wind level of the indoor fan 123a is variable by, for example, changing the rotation speed of the corresponding motor.

<Hot-Water Supply Unit 130>

The hot-water supply unit 130 has a function of transferring heating energy or cooling energy from the outdoor unit 110 to water so as to perform the heating operation or the cooling operation thereon. The hot-water supply unit 130 includes an indoor-water heat exchanger 131, an expansion valve 132, and a hot water tank 133. It is to be noted that although only one hot-water supply unit 130 is shown in FIG. 1, the number of hot-water supply units is not particularly limited and two or more hot-water supply units may be arranged within the system 10 in accordance with the same manner as the hot-water supply unit 130.

The indoor-water heat exchanger 131 is arranged within the space defined by the water tank 133 such that the indoor-water heat exchanger 131 transfers heat from the refrigerant flowing therein to the water stored in the water tank 133. The water heated or cooled by the indoor-water heat exchanger 131 is supplied to the water circuit 104.

The expansion valve 132 in the hot-water supply unit 130 has the same function as the expansion valve 122 in the indoor unit 120a.

The water tank 133 stores water. Preferably, the water tank 133 stores hot water for domestic use in a kitchen, bathroom and the like. The water tank 133 thermally insulates the stored water therein from outside. The hot water in the water tank 133 is preferably kept at a target temperature set by a user, which will be explained later.

Preferably, a sensor (not shown) is arranged to detect status data of the water stored in the water tank 133. The status data of the stored water includes, for example, the temperature of the water and/or the amount of the water. The sensor can be arranged within the space of the water tank 133, on the outer surface of the water tank 133, and/or the outlet of the water tank 133.

As described above, in the system 10, the compressor 111, the switching valve 112, the indoor heating exchanger 121a, the expansion valve 122a, and the outdoor heat exchanger 113 are connected in series to each other. Likewise, the compressor 111, the switching valve 112, the indoor-water heat exchanger 131, the expansion valve 132, and the outdoor heat exchanger 113 are connected in series to each other. Further, the indoor heat exchanger 121a and the indoor-water heat exchanger 131 are connected in parallel with regard to the outdoor heat exchanger 113. Thus, the refrigeration circuit for circulating refrigerant is formed.

Although not illustrated in FIG. 1, the system 10 may further include a sensor that detects a discharge pressure of the refrigerant, a sensor that detects suction pressure of the refrigerant, a sensor that detects at discharge temperature of the refrigerant, a sensor that detects suction temperature of the refrigerant, sensors that detect temperatures of the refrigerant flowing into and flowing out of the outdoor heat exchanger 113, a sensor that detects a temperature of outside air taken into the outdoor unit 110, sensors that detect temperatures of the refrigerant flowing into and flowing out of the indoor heat exchanger 121, and a sensor that detects a temperature of water stored in the hot-water tank 133. Measurement information obtained by these various sensors is transmitted to a controller 100, 200, 300, which will be explained later, and is used to control components in the system 10.

<Heating and Cooling Operations>

During the cooling operation, the outdoor unit 110 and at least one of the indoor unit 120a perform the cooling operation. During the heating operation, the outdoor unit 110 and at least the hot-water supply unit 130 perform the heating operation. The controller 100, 200, 300 of the system 10, which will be explained later, controls relevant components of the system 10 to perform the operations below.

<Heating Operation>

The system 10 is controlled during the heating operation to realize the performance below. A low-pressure gas refrigerant is sucked into the compressor 111. The refrigerant is compressed into a high-temperature-high-pressure status in the compressor 111, is discharged therefrom, passes through the switching valve 112, and flows out of the outdoor unit 110 through the gas main pipe 101. Then the high-pressure gas refrigerant that has flowed out of the outdoor unit 110 flows into the indoor unit 120 and the hot-water supply unit 130. The refrigerant that has flowed into the indoor unit 120 flows into the indoor heat exchanger 121. The refrigerant that has flowed into the hot-water supply unit 130 flows into the indoor-water heat exchanger 131. The high-pressure gas refrigerant is condensed in the indoor heat exchanger 121, turns into a high-pressure liquid refrigerant, and flows out of the indoor heat exchanger 121. Likewise, the high-pressure gas refrigerant turns into high-pressure liquid refrigerant in the indoor-water heat exchanger 131 and flows out thereof.

The high-pressure liquid refrigerant from the indoor heat exchanger 121 is subjected to pressure reduction by the expansion valve 122, and turns into a low-pressure-2-phase gas liquid refrigerant which flows out of the indoor unit 120 through the liquid main pipe 102. Likewise, the high-pressure refrigerant from the indoor-water heat exchanger 131 turns into a low-pressure-2-phase gas liquid refrigerant or low-pressure liquid refrigerant which flows out of the hot-water supply unit 130 through the liquid main pipe 102. Then the low-pressure refrigerant flows into the outdoor heat exchanger 113, exchanges heat with the air supplied from the outdoor fan 115, turns into a low-pressure gas refrigerant, and flows out of the outdoor heat exchanger 113. The refrigerant that has flowed out of the outdoor heat exchanger 113 passes through the switching valve 112 and the accumulator 114, and is sucked into the compressor 111 again.

<Cooling Operation>

The system 10 is controlled during the cooling operation to realize the performance below. The low-pressure gas refrigerant is sucked into the compressor 111. The refrigerant is compressed into a high-temperature-high-pressure status in the compressor 111, and is discharged therefrom. The high-temperature-high-pressure refrigerant flows into the outdoor heat exchanger 113 via the switching valve 112. The high-pressure-gas-refrigerant that has flowed into the outdoor heat exchanger 113 exchanges heat with the air supplied from the outdoor fan 115, and turns into a high-pressure liquid refrigerant. The high-pressure liquid refrigerant flows out of the outdoor unit 110 through the liquid main pipe 102, and then flows towards at least one indoor unit 120a. The refrigerant that has flowed towards the indoor unit 120a is subjected to pressure reduction by the expansion valve 122a so as to turn into a low-pressure-2-phase gas liquid refrigerant or a low-pressure liquid refrigerant. The refrigerant then flows into the indoor heat exchanger 121.

The low-pressure refrigerant that has flowed into the indoor heat exchanger 121 is evaporated in the indoor heat exchanger 121 and turns into a low-pressure gas refrigerant, and flows out of the indoor heat exchanger 121. The low-pressure gas refrigerant that has flowed out of the indoor heat exchanger 121 flows into the outdoor unit 110 through the gas main pipe 101. The low-pressure gas refrigerant that has flowed into the outdoor unit 110 passes through the switching valve 112 and the accumulator 114, and is sucked into the compressor 111 again. The same can be applied when the low-pressure refrigerant is supplied to the hot-water supply unit 130.

<Controller>

FIG. 1 shows that the system 10 includes an outdoor controller 100, two indoor controllers 200 corresponding to each indoor unit 120a, 120b, respectively, and a hot-water supply controller 300. The outdoor controller 100, the indoor controllers 200 and hot-water supply controller 300 constitute a controller that is configured to control the entire operation of the system 10. The location of each controller 100, 200, 300 and distribution of functions of each controller 100, 200, 300 are not limited as long as they can communicate with each other and with measurement devices of the system 10. For example, all controllers can be centralized into one controller and be disposed on the outdoor unit 110. In another embodiment, functions of the outdoor controller 100 and each indoor controller 200 are distributed therebetween differently from the present embodiment.

The outdoor controller 100, the indoor controllers 200 and hot-water supply controller 300 transmit information to each other by wireless or wired communication means. In the present embodiment, the outdoor controller 100 informs the current operation at a predetermined interval of time to the indoor controller 200 of each indoor unit 120a, 120b which is turned-on and the hot-water supply controller 300. An indoor controller 200 of a turned-on indoor unit 120a, 120b transmits its current status to the outdoor controller 100 at a predetermined interval of time. The hot-water supply controller 300 is configured to send a request for hot-water supply to the outdoor controller 100.

<Outdoor Controller 100>

The outdoor controller 100 is configured to control the pressure and the temperature of the refrigerant in the outdoor unit 110. The outdoor controller 100 is further configured to control the frequency of the compressor 111, the switching valve 112, and the rotation speed of the outdoor fan 115.

<Indoor Controller 200>

Each indoor unit 120a, 120b has an indoor controller 200. Hereinafter, the indoor unit controller 200 of the indoor unit 120a is explained as an example. The same explanation is applicable to the indoor controller 200 of any other indoor unit 120b in the system 10.

The indoor controller 200 is configured to control the degree of superheat of the indoor unit 120a during the cooling operation, and control the degree of subcooling of the indoor unit 120a during the heating operation. The indoor controller 200 is configured to control the rotation speed of the indoor fan 123a. The indoor controller 200 is configured to control the opening degree of the expansion valve 122a.

<Hot-Water Supply Controller 300>

The hot-water supply controller 300 is configured to control the degree of subcooling of the hot-water supply unit 130 during the heating operation. The hot-water supply controller 300 is configured to control the opening degree of the expansion valve 132. The hot-water supply controller is configured to control a valve, a pump, or the like. Although not shown in FIG. 1, components are arranged in the hot-water supply unit 130 for controlling the water flow rate.

The hot-water supply controller 300 is configured to send a request for hot-water supply (hereinafter hot-water request) to the outdoor controller 100. The hot-water supply controller sends the hot-water request in accordance with, for example, the temperature and/or the amount of the water stored in the water tank 133, and/or a time of a day.

Preferably, the hot-water supply controller 300 monitors the temperature of the hot water stored in the hot water tank 133. When it determines that the current water temperature is below a target temperature set by a user or below a threshold temperature calculated from the target temperature, the hot-water supply controller 300 sends the hot-water request. Thereby, the hot water stored in the hot-water tank 133 is constantly kept at the target temperature.

<Operation for Stopping an Indoor Fun Before Starting a Heating Operation>

In addition to the functions mentioned above, the controller 100, 200, 300 determines if the hot-water request has occurred during a cooling operation at at least one indoor unit 120a. If yes, the controller 100, 200, 300 continues a cooling operation after the hot-water request has occurred and until a predetermined condition is satisfied, and then starts a heating operation.

Accordingly, the cooling operation at the indoor unit 120a is not immediately interrupted by the hot-water request. The area where the indoor unit 120a is performing the cooling operation is further cooled down even after the hot-water request. Therefore, users' comfort can be ensured in the area for a while even after the cooling operation stops.

The functions of the outdoor controller 100 and the indoor controller 200 are further explained in detail below.

<Outdoor Controller 100>

FIG. 2 is a block diagram showing functions of the outdoor controller 100. The outdoor controller 100 has an operation unit 101, a receiver 102, an update unit 103, a memory 104, a compressor unit 105, a Thermo-off unit 106, a fan unit 107, and a valve unit 108.

The operation unit 101 controls the heating operation and cooling operation mentioned above.

The operation unit 101 is further configured to monitor the hot-water request from the hot-water supply controller 300. The operation unit 101 is configured to determine if the hot-water request has occurred during a cooling operation at at least one indoor unit 120a. If yes, the operation unit 101 continues the cooling operation after the hot-water request has occurred. The operation unit 101 is configured to determine if a predetermined condition is satisfied while continuing the cooling operation. If satisfied, the operation unit 101 stops performing the cooling operation and starts a heating operation. The details of the condition to stop the cooling operation will be explained later.

The operation unit 101 is further configured to stop wind in each area in the cooling operation before starting the heating operation. Accordingly, the operation unit 101 is further configured to instruct the fan unit 107 to transmit a fan-stop command to all of at least one indoor unit which is turned on for the cooling operation. The fan-stop command is a command to stop an indoor fan arranged at an indoor unit. A command for controlling an indoor fan arranged at each indoor unit is created and transmitted by the fan unit 107 in accordance with the instruction of the operation unit 101.

The operation unit 101 is preferably further configured to stop the compressor 111 and an indoor fan of each indoor unit in the cooling operation substantially at the same time. Accordingly, the operation unit 101 is preferably further configured to instruct the fan unit 107 and the compressor unit 105 to transmit the fan-stop command and a compressor-stop command, respectively, substantially at the same time. The compressor-stop command is a command to stop a motor for driving the compressor 111. A command for controlling the compressor 111 is created and outputted by the compressor unit 105 in accordance with the instruction of the operation unit 101.

The operation unit 101 is preferably further configured to stop each indoor fan of an indoor unit in the cooling operation before starting the heating operation. Accordingly, the operation unit 101 is preferably further configured to instruct the fan unit 107 to transmit the fan-stop command before starting the heating operation. Preferably, the operation unit 101 is configured to switch the switching valve 112 from the cooling operation position to the heating operation position after transmission of the fan-stop command.

The operation unit 101 is preferably further configured to maintain the indoor valves of all indoor units 120a, 120b in a predetermined open degree during the heating operation. The operation unit 101 is preferably configured to instruct the valve unit 108 to transmit a valve command to all indoor units 120a, 120b. The valve command is a command to maintain each expansion valve 122a, 122b of all indoor units 120a, 120b at a predetermined open degree. The valve command is created and transmitted by the valve unit 108 in accordance with the instruction of the operation unit 101.

A preferable example of the timing point for transmitting the fan-stop command, the compressor-stop command, and the valve command is shown in FIG. 6, which will be explained later.

The operation unit 101 is preferably further configured to increase the power of the cooling operation after the hot-water request has occurred. The details to increase the power of the cooling operation will be explained later.

The receiver 102 is configured to receive a "Request signal" from each indoor unit 120a, 120b at a predetermined time interval. The receiver 102 is further configured to receive the measurement information such as the outside temperature detected by a sensor 310.

The "Request signal" includes an identification of an indoor unit and preferably current status of the indoor unit. An example of the current status is any one or combination of: ON/OFF, the operation for which the indoor unit is turned on, a target room temperature, a current room temperature, a wind level, and a "Request level".

The "Request level" indicates a required change in the power of a cooling operation. The "Request level" is expressed by, for example, a numeral value that corresponds to a predetermined step width to increase/decrease the rotation frequency of the compressor 111. The operation unit 101 determines based on the "Request level" how much the rotation frequency of the compressor 111 should be increased or decreased.

The update unit 103 is configured to update data stored in the memory 104 in accordance with the received data.

The memory 104 stores a status table and a level table. The contents of each table will be explained later.

The compressor unit 105 creates a command to control the rotation frequency of the compressor 111 in accordance with the instruction from the operation unit 101, and outputs the created command to the driver of the motor of the compressor 111.

The Thermo-off unit 106 creates a command to change a "Thermo-off" temperature at an indoor unit, and transmits the command to one or more relevant indoor units in accordance with the instruction from the operation unit 101.

When a current room temperature in an area of a corresponding indoor unit has reached to its "Thermo-off" temperature, the indoor unit turns into a "Thermo-off" status. This means that the indoor unit stops performing the cooling operation by completely closing the corresponding expansion valve. A "Thermo-off" temperature of an indoor unit is lower than a target temperature of the indoor unit for a cooling operation. A "Thermo-off" temperature of an indoor unit is higher than a target temperature of the indoor unit for a heating operation. The difference between the "Thermo-off" and target temperatures is, for example, 1 to 3 degree. It is preferable that the difference between the "Thermo-off" and target temperature is larger for the cooling operation after the occurrence of the hot-water request than for a normal cooling operation. The detail will be explained later in "Increase of the power of the cooling operation."

The fan unit 107 creates a command to change the rotation frequency of an indoor fan, and transmits the command to one or more relevant indoor units in accordance with the instruction from the operation unit 101.

The valve unit 108 creates a command to change an open degree of an expansion valve of an indoor unit, and transmits the command to one or more relevant indoor units in accordance with the instruction from the operation unit 101.

<Level Table in the Memory 104 of the Outdoor Controller 100>

FIG. 3 shows a level table stored in the memory 104 of the outdoor controller 100. The level table associates a numeral value corresponding to each request level with a step width to increase or decrease the rotation frequency of the compressor 111. Each value of the step width corresponds to a predetermined change in the rotation frequency of the compressor 111.

The "Request level 0" indicates that a room temperature has reached to the Thermo-off temperature of a corresponding area. In other words, the "Request level 0" indicates that the indoor unit in the corresponding area has turned into the "Thermo-off" status. Such an indoor unit requests no change in the rotation frequency of the compressor 111. The "Request level 1, 2, and 3" indicate that the power of the current operation should be lowered. The "Request level 4, 5, and 6" indicate that the power of the current operation should be increased.

The operation unit 101 is preferably configured to choose one "Request level" which has the biggest absolute value to change the rotation frequency of the compressor 111.

<Status Table in the Memory 104>

FIG. 4A shows an example of a status table stored in the memory 104 of the outdoor controller 100. The status table stores "area," "Request level," "operation status," "target temperature," "wind level," and "current temperature" in associated with each other.

The "Request level" is as explained above. The "area" corresponds to an area and identifies an indoor unit installed in the area. The operation status indicates if the indoor unit is turned on or off, and the operation for which the indoor unit is turned on. The target temperature indicates a temperature to which a room temperature of the area of the corresponding indoor unit should be reached. The wind level indicates the level of the rotation frequency of the indoor fan. The current temperature indicates a current temperature of the area of the indoor unit.

The "Request level 0" means that the indoor unit has turned into the "Thermo-off" status. In FIG. 4A, the indoor unit in the "area 1" is turned on for a cooling operation, and has already turned into the "Thermo-off" status. On the other hand, the indoor units in the "area 2" and "area 3" are turned on for the cooling operation, but have not turned into the "Thermo-off" status yet since each "Request level" is more than zero.

<Predetermined Condition to Stop the Cooling Operation>

The operation unit 101 is preferably configured to continue the cooling operation until a predetermined period of time P1 has passed after the hot-water request occurred. After the time period P1 has passed since the hot-water request, the operation unit 101 is configured to stop the cooling operation.

The operation unit 101 is preferably configured to continue the cooling operation until all indoor units which are performing the cooling operation reach to the "Thermo-off" status. The operation unit 101 stops the cooling operation after all indoor units in the cooling operation turn into the "Thermo-off" status. The "Request signal" having the "Request level 0" indicates that the indoor unit has turned into the "Thermo-off" status. The operation unit 101 stops the cooling operation after receiving the "Request signal" having "Request level 0" from all indoor units which are turned on for the cooling operation. Thereby, user's comfort for the cooling operation can be furthermore ensured.

The operation unit 101 preferably adopts any one of or combination of the above mentioned conditions to stop the cooling operation.

<Increase of the Power of the Cooling Operation>

The operation unit 101 is preferably configured to increase the power of the cooling operation before starting the heating operation. Preferable examples for increasing the power are explained below.

Example 1

The operation unit 101 is preferably configured to perform, after the hot-water request has occurred and before the heating operation starts, the cooling operation at all indoor units which are already turned on for the cooling operation at the time point of the occurrence of the hot-water request.

In this application, an "indoor unit which is turned on for the cooling operation" is either one of an indoor unit that has turned into the "Thermo-off" status and an indoor unit that is performing the cooling operation. An "indoor unit in the cooling operation" means the same as an "indoor unit which is turned on for the cooling operation."

Even if all indoor units in the cooling operation have already turned into the "Thermo-off" status when the hot-water request occurred, the indoor units are preferably forced to perform the cooling operation. Thereby, the cooling operation is forced to be performed in the Thermo-off status area, and the power of the cooling operation increases. If one of the indoor units in the cooling operation is still performing the cooling operation while the others have turned into the "Thermo-off" status as the hot-water request occurred, the latter indoor units are forced to perform the cooling operation.

Example 2

The operation unit 101 is preferably configured to perform the cooling operation at all of the indoor units 120a, 120b after the hot-water request has occurred and before the heating operation starts.

Even if only the indoor unit 120a is turned on for the cooling operation and the indoor unit 120b is turned off, not only the indoor unit 120a but also the indoor unit 120b are forced to perform the cooling operation. As mentioned above, if the indoor unit 120a is turned on and already has turned into the "Thermo-off" status, it is also forced to perform the cooling operation. Thereby, all indoor units in the system 10 are forced to perform the cooling operation, and the power of the cooling operation increases. The indoor unit 120b, which was previously turned off at the time of the hot-water request, is forced to perform a cooling operation in the corresponding area. Accordingly, the user comfort can be ensured in any area even after the cooling operation has already stopped and the heating operation has begun.

Example 3

The operation unit 101 is preferably configured to instruct the compressor unit 105 to output, during the cooling operation and after the hot-water request has occurred, a command to increase the rotation frequency thereof. The operation unit 101 preferably stores a predetermined value to increase amount of the rotation frequency. The compressor unit 105 creates a command based on the instruction of the operation unit 101 and outputs the command to the driver of the motor of the compressor 111.

Example 4

The operation unit 101 is preferably configured to instruct the Thermo-off unit 106 to transmit, during the cooling operation and after the request has occurred, a command to lower a Thermo-off temperature of each indoor unit performing the cooling operation. The instruction preferably specifies the change amount in the Thermo-off temperature based on each target temperature of the corresponding indoor unit. Alternatively, the operation unit 101 preferably lowers the Thermo-off temperature by a predetermined value. Such a predetermined value is preferably larger than another predetermined value to set the Thermo-off temperature during a normal cooling operation other than an operation for increasing the power of the cooling operation upon the hot-water request. For example, the operation unit 101 sets the Thermo-off temperature at a temperature two-degree lower than the target temperature when increasing the power of the cooling operation upon the hot-water request. Otherwise, the Thermo-off temperature is set at a temperature one-degree lower than the target temperature. The Thermo-off unit 106 preferably transmits the command to all indoor units which are performing the cooling operation.

Example 5

The operation unit 101 is preferably configured to instruct the fan unit 107 to transmit, during the cooling operation and after the request has occurred, a command to indicate an increase amount of a rotation frequency of each indoor unit performing the cooling operation. The instruction preferably specifies the increase amount of the rotation frequency based on, for example, the outside temperature, a predetermined value of increase amount, a difference between a current room temperature and a target temperature. The fan unit 107 creates the command in accordance with the instruction and transmits the command to all indoor units which are performing the cooling operation.

Example 6

The operation unit 101 is preferably configured to instruct the valve unit 108 to transmit to all indoor units 120a in the cooling operation, during the cooling operation and after the request has occurred, a command to decrease an open degree of each expansion valve 122a. The instruction preferably identifies the open degree of each expansion valve or a change amount in the open degree. The valve unit 108 creates the command in accordance with the instruction and transmits the command to all indoor units which are performing the cooling operation.

Example 7

The operation unit 101 is preferably configured to instruct the compressor unit 105 to create and output a command to the compressor 111 during the cooling operation and after the request has occurred. The instruction specifies the increase amount of the rotation frequency of the compressor 111 by a predetermined value which is independent from each "Request level" stored in the status table in the memory 104. In other words, even in the case none of the indoor units that is turned on for the cooling operation transmits a "Request level" to increase the power of the cooling operation, the rotation frequency of the compressor 111 increases. Thereby, the power of the cooling operation is forced to increase.

The operation unit 101 may perform any one or any combination of the above-mentioned examples to increase the power of the cooling operation.

<Indoor Controller 200>

FIG. 5 is a block diagram showing functions of the indoor controller 200 of the indoor unit 120a. The explanation below is applicable to other indoor units. The indoor controller 200 has an operation unit 201, a receiver 202, an update unit 203, a memory 204, a request unit 205, a fan unit 206, and a valve unit 207.

The operation unit 201 controls the heating operation and cooling operation mentioned above.

The receiver 202 receives commands from the outdoor controller 100. The receiver 202 receives inputs from the input device (not shown) to control the indoor unit 120a. The receiver 202 receives a current room temperature detected by a temperature sensor 320.

The update unit 203 updates a status table stored in the memory 204 based on the data received by the receiver 202. FIG. 5B shows the status table stored in the memory 204 of the indoor controller 200. The status table stores the Thermo-off temperature in addition to the data stored in the status table in the memory 104 of the outdoor controller 100. The explanation of the data stored in the outdoor controller 100 is applicable to the common data stored in the indoor controller 200.

The request unit 205 creates the "Request signal" based on the data stored in the status table. The request unit 205 transmits the "Request signal" to the outdoor controller 100 at the predetermined time interval. The "Request signal" includes, as explained above, an identification of an indoor unit and preferably current status of the indoor unit.

The fan unit 206 outputs a signal to a driver of the motor of the corresponding indoor fan 123a to stop the motor in accordance with the fan-stop command from the outdoor controller 100. The fan unit 206 outputs a signal to the driver of the motor of the corresponding indoor fan 123a to change the rotation frequency of the motor in accordance with an input from the input device.

The valve unit 207 controls the open degree of the expansion valve 122a in accordance with the instruction from the operation unit 201. Further, the valve unit 207 outputs a signal to the corresponding expansion valve 122a to change the open degree of the expansion valve 122a in accordance with the data received by the receiver 202. The received data is, for example, the command sent from the outdoor controller 200 to designate a specific open degree.

<Time Chart>

FIG. 6 shows a preferable example of a time chart for switching from a cooling operation to a heating operation triggered by the hot-water request. The operation mode is switched from the cooling operation into the heating operation by the hot-water request occurred at a time t0 during the cooling operation.

The compressor unit 105 of the outdoor controller 100 outputs the compressor-stop command to stop the compressor 111 at a time t1 which is preferably after a while from the time t0. Thereby, the compressor 111 stops working and the cooling operation ends. The compressor unit 105 further outputs a second command (hereinafter a compressor-start command) to drive the compressor 111 at a time t2 which is after a short time period Pw from the time t1.

The operation unit 101 of the outdoor controller 100 outputs a switch command to switch the switching valve 112 from the cooling operation position to the heating operation position. The switching valve 112 is switched after the time t1 when the compressor 111 stops for the cooling operation and before or at the latest the time t2 when the compressor 111 starts operation again. The switch command is preferably outputted substantially simultaneously at the time t2 when the compressor 111 starts operation again. Thereby, the heating circuit is switched into the heating refrigerant circuit at the end of the time period Pw.

The fan unit 107 of the outdoor controller 100 transmits the fan-stop command to stop an indoor fan. The fan-stop command is transmitted at the time t1 at the earliest and no later than the time t2 when the compressor 111 starts operation again. Preferably, the fan-stop command is transmitted substantially simultaneously at the time t1 when the compressor-stop command is outputted. The fan-stop command is transmitted to all indoor units performing the cooling operation. The fan unit 206 of each indoor unit outputs a signal to stop the corresponding indoor fan accordingly.

Thereby, no warm wind blows out during the heating operation in an area where an indoor unit is turned on for the cooling operation.

<Flow of Process>

<Main Process of the Outdoor Controller 100>

FIGS. 7A and 7B show an example of the main process performed by the outdoor controller 100. The main process starts when the outdoor unit is turned on.

The outdoor controller 100 monitors if the hot-water supply controller requests for the hot-water supply (step S1). If yes, the process proceeds to step S2.

The outdoor controller 100 determines if the current operation mode is a cooling operation (step S2). If yes, the process proceeds to step S3. If not, the process proceeds to step S8 which will be explained later.

The outdoor controller 100 determines if all indoor units in the cooling operation have turned into the "Thermo-off" status (step S3). Thereby, it can be ensured that the heating operation starts only after a current room temperature of each area in the cooling operation has reached to a target temperature. If yes, the process proceeds to step S6 mentioned later. If no, the process proceeds to step S4.

The outdoor controller 100 performs an increase process at the step S4. The increase process increases the power of the cooling operation which is currently being performed. Thereby, each area in the cooling operation can be quickly cooled down before the heating operation starts.

The outdoor controller 100 repeats the increase process at the step S4 until all indoor units in the cooling operation turn into the "Thermo-off" status (step S3), or until the predetermined time period P1 passes from the occurrence of the hot-water request (step S5). The step S5 can ensure the minimum period of time P1 to keep the cooling operation in active even after the hot-water request. If yes at either one of the steps S3 and S5, the process proceeds to step S6.

The outdoor controller 100 outputs the compressor-stop command and stops the rotation of the compressor 111 (step S6). Thereby, the cooling operation ends. In addition, the outdoor controller 100 transmits the fan-stop command to stop an indoor fun to all indoor units which were turned on for the cooling operation (step S6). Thereby, during the subsequent heating operation, no warm wind blows out of the indoor units which were turned on for the cooling operation.

The outdoor controller 100 determines if a predetermined time period Pw has passed after the output of the compressor-stop command (step S7). After the time period Pw has passed, the process proceeds to step S8.

The outdoor controller 100 transmits the valve command to all indoor units to keep the corresponding expansion valves slightly open (step S8). Thereby, a small amount of the refrigerant flows through each indoor unit during the heating operation which will be subsequently performed. Accordingly, the entire amount of the refrigerant circulates in the refrigerant circuit during the heating operation without stagnation.

After the time period Pw has passed from the compressor-stop command, the outdoor controller 100 switches the switching valve 112 into the heating operation position, and starts driving the motor of the compressor 111 (step S9). Thereby, the heating operation starts. The hot-water supply is performed during the heating operation, and the water stored in the water tank 133 is heated up.

The outdoor controller 100 determines if a difference between any target temperature and the outside temperature is more than a predetermined threshold value (step S10). When the difference goes beyond the threshold value in any area, it is the time to resume a cooling operation. If yes, the process proceeds to step S11.

The outdoor controller 100 stops the rotation of the motor of the compressor 111 (step S11). Thereby, the heating operation and the hot-water supply end.

The outdoor controller 100 switches the switching valve 112 into the cooling operation position, and drives the motor of the compressor 111 to resume a cooling operation (step S12).

The outdoor controller 100 repeats the steps S1 to S12 mentioned above until the outdoor unit is turned off (step S13).

The flow of the process above is an example and is not limited thereto. For example, in another embodiment, the condition to stop the cooling operation may be either one of or the combination of the steps S3 and S5.

In another embodiment, the increase process at step S4 may be omitted.

As for the condition to quit the heating operation, as an alternative of a step 10, a difference between any current room temperature and a corresponding target temperature may be used.

<Increase Process of the Outdoor Controller 100>

FIG. 8 shows an example of the flow of increase process performed during the main process in FIG. 7A, 7B by the outdoor controller 100. At step S4 of the main process, the outdoor controller 100 performs the increase process to increase the power of the cooling operation which is currently being performed after the hot-water request.

The outdoor controller 100 transmits a command to lower each Thermo-off temperature at each indoor unit which is performing the cooling operation (step S41).

The outdoor controller 100 transmits a command to increase the rotation frequency of the indoor fan of each indoor unit which is performing the cooling operation (step S42). Thereby, the amount of wind from each indoor unit increases.

The outdoor controller 100 transmits a command to slightly close the expansion valve of each indoor unit which is performing the cooling operation (step S43). Thereby, an evaporation temperature of each indoor unit is lowered, which increases the power of the cooling operation.

The outdoor controller 100 determines if any increase of the cooling operation is requested by any one of the indoor units which are performing the cooling operation (step S44). The determination is made based on the "Request level" of each indoor unit stored in the status table in the memory 104. If yes, the process proceeds to the step S45. If no, the process proceeds to step S46.

The outdoor controller 100 increases the rotation frequency of the compressor 111 in accordance with the highest request level in the status table in the memory 104 (step S45).

The outdoor controller 100 increases the rotation frequency of the compressor 111 based on the predetermined step width of increase (step S46). Thereby, the power of the cooling operation increases even when none of indoor units in the cooling operation requests an increase of power of the cooling operation.

The order of the steps S41 to S46 is not limited to the one mentioned above. Any one or more steps among the steps S41 to S46 may be omitted.

<Main Process of Indoor Controller 200>

FIG. 9 shows an example of the main process performed by the indoor controller 200. The indoor main process starts when an indoor unit is turned on.

The indoor controller 200 monitors the current operation transmitted from the outdoor controller 100 at a predetermined time interval (step S201). The process proceeds to step S202 upon the receipt of the current operation mode.

The indoor controller 200 determines if the current operation will change from a cooling operation into a heating operation (step S202). If yes, the process proceeds to step S203. If no, the process returns to step S201.

The indoor controller 200 increases the power of the cooling operation currently running in accordance with a command from the outdoor controller 100 (step S203). For example, the indoor controller 200 changes based on the command a rotation frequency of the corresponding indoor fan, the Thermo-off temperature, and/or the open degree of the corresponding expansion valve.

The indoor controller 200 receives the fan-stop command from the outdoor controller 100 to stop a corresponding indoor fan. The indoor controller 200 stops the corresponding indoor fan in accordance with the fan-stop command (step S204). Thereby, no warm window blows out of the indoor unit during the heating operation which will be subsequently performed.

The indoor controller 200 receives the valve command from the outdoor controller 100, and controls the open degree of the corresponding expansion valve in accordance with the valve command (step S205). Thereby, it can be ensured that the entire amount of the refrigerant can circulate within the refrigerant circuit during the heating operation.

The indoor controller 200 repeats the step 201 to 205 mentioned above until the indoor unit is turned off (step S206).

In the main process of the indoor controller 200 mentioned above, the step 203 may be omitted in the case the main process of the outdoor controller 100 does not perform the increase process.

<Modifications>

Followings are other preferred embodiments according to the system of the present invention.

<First Modification>

FIG. 10 shows a system 10' according to a modification of the system 10 in the above embodiment. The system 10' is different from the system 10 in that each expansion valve corresponding to each indoor unit or a hot-water supply unit is arranged in an outdoor unit. In FIGS. 1 and 10, the components with the same reference signs in the systems 10, 10' have the same or corresponding function. Accordingly, only the difference between the systems 10, 10' will be explained below. The common components and/or functions between the systems 10, 10' can be referred to in the explanation about the system 10 above.

The system 10' in FIG. 10 has an outdoor unit 110', at least one indoor units 120a', 120b', and a hot-water supply unit 130', which are connected to each other. Each unit in the system 10' is connected with each other in the same manner as the connection in the system 10.

The outdoor unit 110' has expansion valves 122a, 122b, 132 which are arranged for each of the indoor units 120a', 120b' and the hot-water supply unit 130', respectively. The structure of each expansion valve 122a, 122b, 132 is the same as expansion valve in the system 10. The connections between each expansion valve 122a, 122b, 132 and other components in the system 10' are the same as expansion valve in the system 10.

The outdoor unit 110' has an outdoor controller 100'. The outdoor controller 100' has the same function as the outdoor controller 100 in the system 10, and further has the function to control the opening degree of each of the expansion valves 122a, 122b, 132.

Each indoor unit 120a', 120b' has an indoor controller 200'. The indoor controller 200' has the same function as the indoor controller 200 in the system 10 other than the function for controlling a corresponding expansion valve.

The hot-water supply unit 130 has a hot-water supply controller 300'. The hot-water supply controller 300' has same function as the hot-water supply controller 300 in the system 10 other than the function for controlling a corresponding expansion valve.

<Second Modification>

The functions of the outdoor controller 100, 100', each indoor controller 200, 200', and the hot-water supply controller 300 may be distributed therebetween differently from the systems 10, 10' mentioned above. For example, a part of controls performed by the indoor controller 200, 200' may be alternatively performed by the corresponding outdoor controller 100, 100', and vice versa. The control of any component in the systems 10, 10' may be switched between the outdoor controller 100, 100' and indoor controller 200, 200' in accordance with a predetermined condition.

For example, the outdoor controller 100, 100' may generate a command to control the expansion valves 122a, 122b, 132, and transmit the command directly to the expansion valves 122a, 122b, 132. Likewise, the outdoor controller 100, 100' may generate a command to control the indoor fans 123a, 123b, and transmit the command directly to the indoor fans 123a, 123b. It is preferable to control the expansion valves 122a, 122b, 132 and the indoor fans 123a, 123b by the outdoor controller 100, 100' after the hot-water request during the cooling operation and until the end of the subsequent heating operation.

It is further preferable that the expansion valves 122a, 122b, 132 and the indoor fans 123a, 123b are independently controlled by the corresponding indoor controller 200 or the hot-water supply controller 300 during a normal operation period. A normal operation period is other than the period "after the hot-water request during a cooling operation and until the end of the heating operation subsequently performed after the cooing operation."

While only selected embodiments have been chosen to illustrate the present invention, it will be apparent to those skilled in the art from this disclosure that various changes and modifications can be made herein without departing from the scope of the invention as defined in the appended claims. For example, unless specifically stated otherwise, the size, shape, location or orientation of the various components can be changed as needed and/or desired so long as the changes do not substantially affect their intended function. Unless specifically stated otherwise, components that are shown directly connected or contacting each other can have intermediate structures disposed between them so long as the changes do not substantially affect their intended function. The functions of one element can be performed by two, and vice versa unless specifically stated otherwise. The structures and functions of one embodiment can be adopted in another embodiment. It is not necessary for all advantages to be present in a particular embodiment at the same time. Thus, the foregoing descriptions of the embodiments according to the present invention are provided for illustration only.

The invention claimed is:

1. A system for air-conditioning and hot-water supply and configured to selectively perform a cooling operation and a heating operation, comprising:
   an outdoor unit having a compressor and an outdoor heat exchanger;
   at least one or more indoor units each of which is connected to the outdoor unit and includes an indoor heat exchanger;
   a hot-water supply unit connected to the outdoor unit so as to be arranged in parallel to the at least one or more indoor units and including a refrigerant-water heat exchanger;
   a controller configured to, upon occurrence of a request for hot-water supply from the hot-water supply unit while the cooling operation is being performed by at least one indoor unit among the at least one or more indoor units, transmit to each of the at least one indoor units performing the cooling operation, a fan-stop command to stop a fan arranged at each of the at least one indoor units and then to start the heating operation in accordance with the request.

2. The system for air-conditioning and hot-water supply according to claim 1, wherein
   the controller is further configured to transmit to the compressor a compressor-stop command to stop the compressor; and
   the controller is further configured to transmit the compressor-stop command and the fan-stop command substantially at the same time.

3. The system for air-conditioning and hot-water supply according to claim 1, further comprising a plurality of valves, each valve being arranged for a corresponding one of the hot-water supply unit and the at least one or more indoor units and which is configured to control an amount of refrigerant supplied to theft corresponding hot-water supply unit or indoor unit.

4. The system for air-conditioning and hot-water supply according to claim 3, wherein the controller is configured to maintain each valve corresponding to each indoor unit in a predetermined open degree during the heating operation.

5. The system for air-conditioning and hot-water supply according to claim 2, wherein the controller is further configured to transmit said fan-stop command before starting the heating operation.

6. The system for air-conditioning and hot-water supply according to claim 2, further comprising
   a plurality of valves, each valve being arranged for a corresponding one of the hot-water supply unit and the at least one or more indoor units and which is configured to control an amount of refrigerant supplied to the corresponding hot-water supply unit or indoor unit.

* * * * *